United States Patent
Ham et al.

(10) Patent No.: US 8,934,002 B2
(45) Date of Patent: Jan. 13, 2015

(54) LIQUID CRYSTAL DISPLAY DEVICE AND METHOD FOR DRIVING THE SAME

(75) Inventors: Jung Hyun Ham, Gyeonggi-do (KR); Heume Il Baek, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 372 days.

(21) Appl. No.: 13/155,885

(22) Filed: Jun. 8, 2011

(65) Prior Publication Data

US 2011/0304616 A1    Dec. 15, 2011

(30) Foreign Application Priority Data

Jun. 10, 2010   (KR) ................... 10-2010-0054739

(51) Int. Cl.
| | | |
|---|---|---|
| H04N 13/00 | (2006.01) | |
| G02B 27/22 | (2006.01) | |
| G02B 27/00 | (2006.01) | |
| G09G 3/00 | (2006.01) | |
| H04N 13/04 | (2006.01) | |

(52) U.S. Cl.
CPC ........ G02B 27/2264 (2013.01); G02B 27/0093 (2013.01); G09G 3/003 (2013.01); H04N 13/0438 (2013.01); H04N 13/0454 (2013.01); G09G 2320/0646 (2013.01); G09G 2370/04 (2013.01)
USPC ............. 348/56; 348/42; 348/43; 348/44; 348/45; 348/46; 348/47; 348/48; 348/49; 348/50; 348/51; 348/52; 348/53; 348/54; 348/55; 348/57; 348/58; 348/59; 348/60

(58) Field of Classification Search
USPC .......... 345/419, 660, 697; 348/41–60; 359/17
See application file for complete search history.

(56) References Cited

U.S. PATENT DOCUMENTS 6,996,267 B2 *  2/2006  Tabata .................. 382/154
8,319,828 B2 * 11/2012  Kim et al. ................ 348/56

(Continued)

FOREIGN PATENT DOCUMENTS

CN   101123734   2/2008
CN   101267574   9/2008

(Continued)

OTHER PUBLICATIONS

Chinese Office Action dated Jul. 23, 2013 and English translation of same.

*Primary Examiner* — Dave Czekaj
*Assistant Examiner* — Shanika Brumfield
(74) *Attorney, Agent, or Firm* — Morgan, Lewis & Bockius LLP

(57) ABSTRACT

Disclosed is an LCD device which facilitates to improve picture quality of two-dimensional (2D) and three-dimensional (3D) images by automatically converting an image driving mode (2D/3D) in accordance with a viewing distance, and a method for driving the same, wherein the device comprises a distance measuring unit which measures a viewing distance between the LCD device and a viewer; an image mode controller which sets a 2D image mode or 3D image mode in accordance with a comparison result between the viewing distance and a preset reference distance; a timing controller which aligns externally-provided image signals in accordance with the 2D image mode or 3D image mode set by the image mode controller, and converts the aligned image signals into image data by frame unit; and a liquid crystal panel which displays an image based on the 2D image mode or 3D image mode.

10 Claims, 6 Drawing Sheets

(56) References Cited

U.S. PATENT DOCUMENTS

| | | |
|---|---|---|
| 8,487,917 B2 | 7/2013 | Han et al. |
| 2004/0246272 A1* | 12/2004 | Ramian .......................... 345/660 |
| 2006/0120706 A1* | 6/2006 | Cho et al. ........................ 396/17 |
| 2006/0227420 A1* | 10/2006 | Cha et al. ...................... 359/465 |
| 2007/0008617 A1* | 1/2007 | Shestak et al. ................ 359/455 |
| 2008/0266387 A1* | 10/2008 | Krijn et al. ..................... 348/51 |
| 2009/0073157 A1 | 3/2009 | Lin |
| 2009/0164896 A1* | 6/2009 | Thorn ........................... 715/700 |
| 2010/0182404 A1* | 7/2010 | Kuno ............................. 348/43 |
| 2010/0245400 A1* | 9/2010 | Nakahata et al. ............. 345/690 |
| 2010/0328438 A1* | 12/2010 | Ohyama et al. ................ 348/51 |
| 2011/0122127 A1* | 5/2011 | Ko et al. ....................... 345/419 |
| 2011/0254846 A1* | 10/2011 | Lee et al. ...................... 345/427 |
| 2012/0050508 A1* | 3/2012 | Lee ................................ 348/56 |
| 2012/0218325 A1* | 8/2012 | Hiroki et al. ................. 345/697 |

FOREIGN PATENT DOCUMENTS

| | | | |
|---|---|---|---|
| JP | 2005092103 A | * | 4/2005 |
| JP | 2012028928 A | * | 2/2012 |
| WO | WO 9921356 A1 | * | 4/1999 |

* cited by examiner (MEASURING VIEWING DISTANCE FOR 2D/3D
CONVERSION BY THE USE OF SENSOR)

LIQUID CRYSTAL DISPLAY DEVICE AND METHOD FOR DRIVING THE SAME

CROSS REFERENCE TO RELATED APPLICATIONS

This application claims the benefit of the Korean Patent Application No. 10-2010-0054739 filed on Jun. 10, 2010, which is hereby incorporated by reference as if fully set forth herein.

BACKGROUND OF THE INVENTION

1. Field of the Invention

The present invention relates to a liquid crystal display (LCD) device, and more particularly, to an LCD device which facilitates to improve picture quality of two-dimensional (2D) and three-dimensional (3D) images by automatically converting an image driving mode (2D/3D) in accordance with a viewing distance, and a method for driving the same.

2. Discussion of the Related Art

A display device has been continuously developed to satisfy various requirements such as large-sized screen and thin profile. Especially, there is the explosive increase for flat type display devices having advantages of thin profile, lightness in weight, and low power consumption.

The flat type display device may include a liquid crystal display device (LCD), a plasma display panel (PDP), a field emission display device (FED), a light-emitting diode display device (LED), and etc.

Among the various flat panel display devices, the LCD device is widely used owing to various advantages, for example, technical development for the mass production, easiness of driving means, low power consumption, and high-quality resolution.

The LCD device comprises a liquid crystal panel with a plurality of liquid crystal cells arranged in a matrix configuration; a backlight unit for supplying light to the liquid crystal panel; and a driving circuit for driving the liquid crystal panel.

There are the plural liquid crystal cells defined by crossing a plurality of gate lines and a plurality of data lines of the liquid crystal panel. Each liquid crystal cell is provided with pixel electrode and common electrode for applying an electric field. Each of the liquid crystal cells is switched via a thin film transistor (TFT).

The driving circuit includes a gate driver (G-IC) for supplying a scan signal to the gate lines; a data driver (D-IC) for supplying a data voltage based on an image signal to the data lines; a timing controller (T-con) for supplying a control signal to the gate driver and data driver, and supplying image data to the data driver; and a light source (backlight) for supplying light to the liquid crystal panel.

In the LCD device, an alignment of liquid crystal is changed depending on a voltage formed between the pixel electrode and the common electrode pixel-by-pixel. Thus, transmittance of light emitted from the backlight unit can be controlled through the alignment of liquid crystal, to thereby display the image.

Recently, a user's demand for a stereoscopic image is rapidly increased so that an LCD device capable of displaying 3D (3-dimensional) image as well as 2D (2-dimensional) image is actively developed.

The LCD device displaying 3D image can realize the 3D image through a difference in viewing between both eyes of the user (binocular parallax display).

There have been proposed a shutter glass method using stereoscopic glasses, and a patterned retarder method using polarizing glasses.

FIG. 1 illustrates a method of realizing 3D image by the use of shutter glass according to the related art.

Referring to FIG. 1, the method of realizing 3D image by the use of shutter glass according to the related art is to use the user's binocular parallax.

After 2D left-eye image and 2D right-eye image, which are different from each other, are respectively viewed by the left and right eyes of the user, two of the 2D images are integrated so that the integrated image is recognized as the 3D image by the user.

For this, a liquid crystal panel 10 separately displays 2D images for the left-eye viewing and right-eye viewing with a difference in time. Through the use of shutter glass 20, the right-eye viewing is intercepted and the 2D image is viewed by the left eye when the 2D image for the left-eye viewing is displayed on the liquid crystal panel 10; and the left-eye viewing is intercepted and the 2D image is viewed by the right eye when the 2D image for the right-eye viewing is displayed on the liquid crystal panel 10.

Thus, after the different 2D images are respectively viewed by the left eye and the right eye with the different in time, the viewed 2D images are integrated so that the integrated image is recognized as the 3D image by the user.

FIG. 2 illustrates a method of realizing 3D image by the use of polarizing glasses according to the related art.

Referring to FIG. 2, the patterned retarder method using the polarizing glasses provides a patterned retarder (PR) layer in a liquid crystal panel 10. Light emitted from the liquid crystal panel 10 is leftward or rightward circularly polarized by the patterned retarder (PR) layer.

At this time, the left-eye image is displayed in pixels corresponding to the half of the pixels included in the liquid crystal panel 10, for example, the pixels in the odd-numbered lines of the liquid crystal panel 10; and the right-eye image is displayed in pixels corresponding to the other half of the pixel included in the liquid crystal panel 10, for example, the pixels in the even-numbered lines of the liquid crystal panel 10.

The patterned retarder (PR) layer leftward circularly retards the light emitted from the half of the pixels included in the liquid crystal panel 10, to thereby display the left-eye image. Also, the patterned retarder (PR) layer rightward circularly retards the light emitted from the other half of the pixels included in the liquid crystal panel 10, to thereby display the right-eye image.

The left-eye image is perceived only by the user's left eye through the left glass of the polarizing glasses 30; and the right-eye image is perceived only by the user's right eye through the right glass of the polarizing glasses 30.

Thus, the left-eye image and the right-eye image are separately displayed, and then two of the left-eye image and the right-eye image are integrated, whereby the integrated image is recognized as the 3D image by the user.

FIG. 3 illustrates an image distortion when the 3D image is displayed on the LCD device according to the related art. FIG. 4 illustrates user's fatigue occurrence when the 3D image is displayed on the LCD device according to the related art.

Referring to FIGS. 3 and 4, in case of the aforementioned shutter glass method and patterned retarder method, the picture quality of 3D image is affected by the viewing distance.

As shown in FIG. 3, if the user watches the image 40 displayed on the liquid crystal panel 10 at an appropriate distance, the image transmitted via the shutter glass 20 or polarizing glass 30 is recognized as the normal 3D image.

However, if the user watches the image 40 displayed on the liquid crystal panel 10 at a distance shorter than the appropriate distance, the image transmitted via the shutter glass 20 or polarizing glass 30 is distorted, which causes the deteriorated picture quality of 3D image.

As shown in FIG. 4, when the user watches the 3D image displayed on the liquid crystal panel 10, the user's visual fatigue may be changed depending on the viewing distance. When the user watches the 3D image, the user's visual fatigue can be reduced by the appropriate viewing distance.

For example, if the user watches the 3D image while maintaining the appropriate distance above 2 m (more preferably about 2.4 m) from the liquid crystal panel 10, the user does not feel fatigued with the 3D image having +1 m~−4 m image depth.

However, if the user watches the 3D image while maintaining the distance less than 2 m from the liquid crystal panel 10, the user feels fatigued with the 3D image. Thus, when the user watches the 3D image at the short distance from the liquid crystal panel 10 for a long time, it might make the user dizzy.

SUMMARY OF THE INVENTION

Accordingly, the present invention is directed to an LCD device and a method for driving the same that substantially obviates one or more problems due to limitations and disadvantages of the related art.

An aspect of the present invention is to provide an LCD device which facilitates to improve picture quality of two-dimensional (2D) and three-dimensional (3D) images by automatically converting an image driving mode (2D/3D) in accordance with a viewing distance, and a method for driving the same.

Another aspect of the present invention is to provide an LCD device which facilitates to improve picture quality by preventing image distortion for viewing 3D image at a short distance from a liquid crystal panel, and a method for driving the same.

Another aspect of the present invention is to provide an LCD device which facilitates to improve picture quality by preventing user's visual fatigue when a user watches 3D image at a short distance from a liquid crystal panel.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an LCD device for displaying both 2D and 3D images comprising: a distance measuring unit which measures a viewing distance between the LCD device and a viewer; an image mode controller which sets a 2D image mode or 3D image mode in accordance with a comparison result between the viewing distance and a preset reference distance; a timing controller which aligns externally-provided image signals in accordance with the 2D image mode or 3D image mode set by the image mode controller, and converts the aligned image signals into image data by frame unit; and a liquid crystal panel which displays an image based on the 2D image mode or 3D image mode.

In another aspect of the present invention, there is provided a method for driving an LCD device for displaying both 2D and 3D images comprising: measuring a viewing distance between the LCD device and a viewer; setting a 2D image mode or 3D image mode in accordance with a comparison result between the viewing distance and a preset reference distance; aligning externally-provided image signals in accordance with the 2D image mode or 3D image mode set by the image mode controller, and converting the aligned image signals into image data by frame unit; and displaying an image based on the 2D image mode or 3D image mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an LCD device according to the present invention and a method for driving the same will be described with reference to the accompanying drawings.

Figure 1:
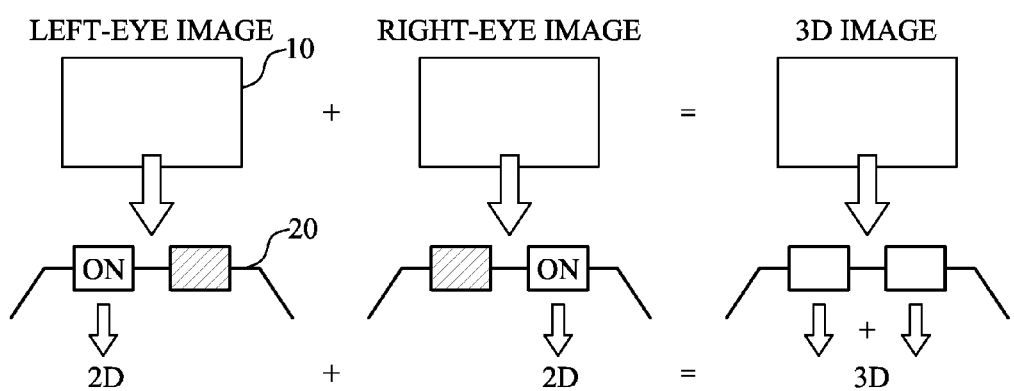
FIG. 1 illustrates a method for displaying a 3D image in a related art method using shutter glasses.
Figure 2:
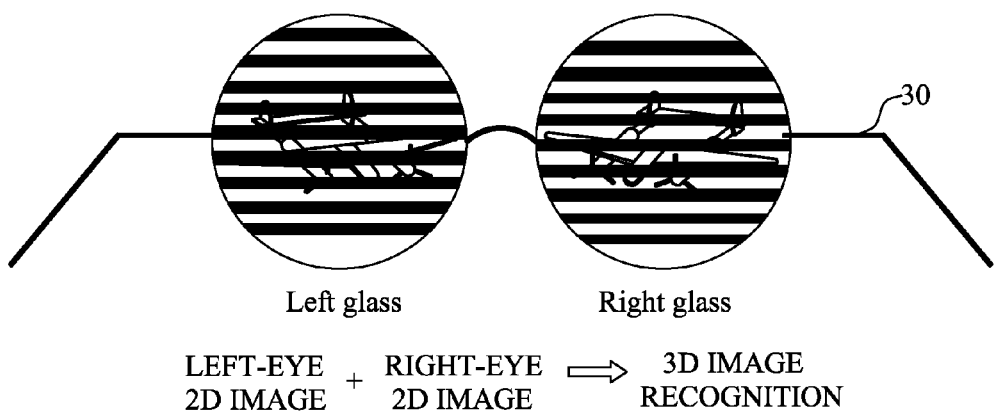
FIG. 2 illustrates a method for displaying a 3D image in a related art method using polarizing glasses.
Figure 3:
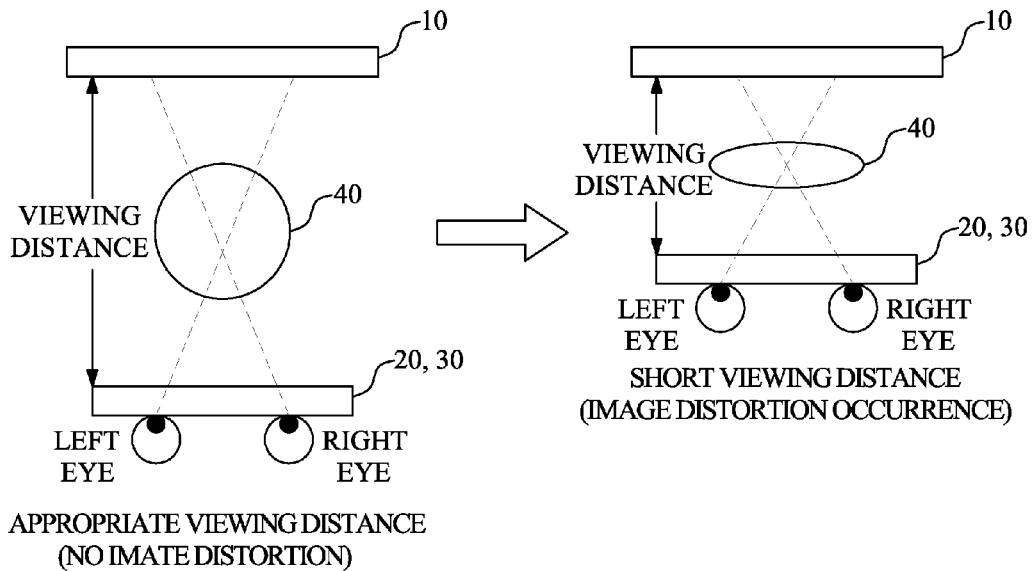
FIG. 3 illustrates an image distortion when a user watches a 3D image in a related art LCD device.
Figure 4:
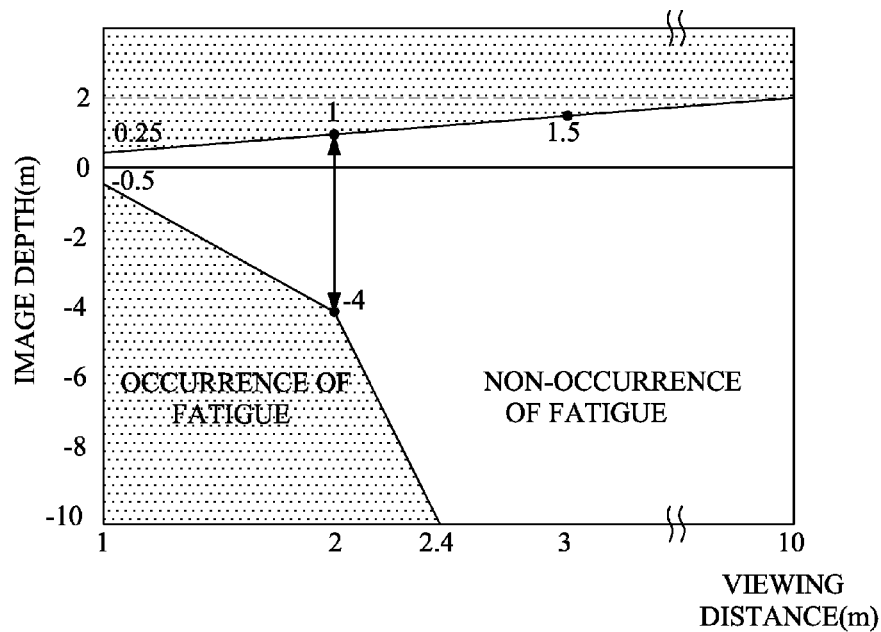
FIG. 4 illustrates a user's fatigue when a user watches a 3D image in a related art LCD device.
Figure 5:
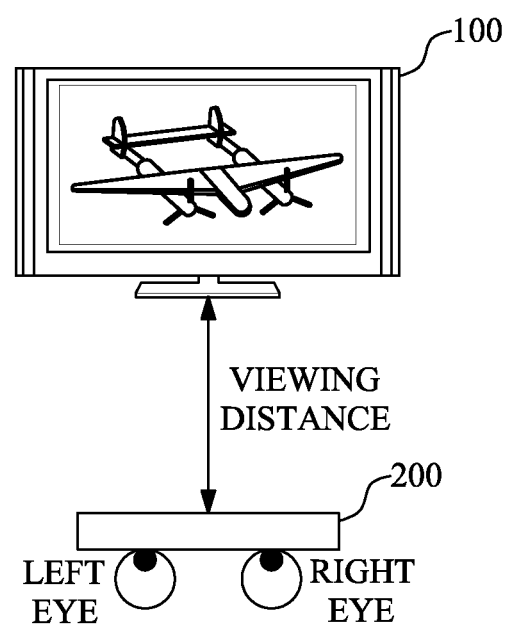
FIG. 5 illustrates a 2D/3D image converting method in an LCD device according to an embodiment of the present invention.
Figure 6:
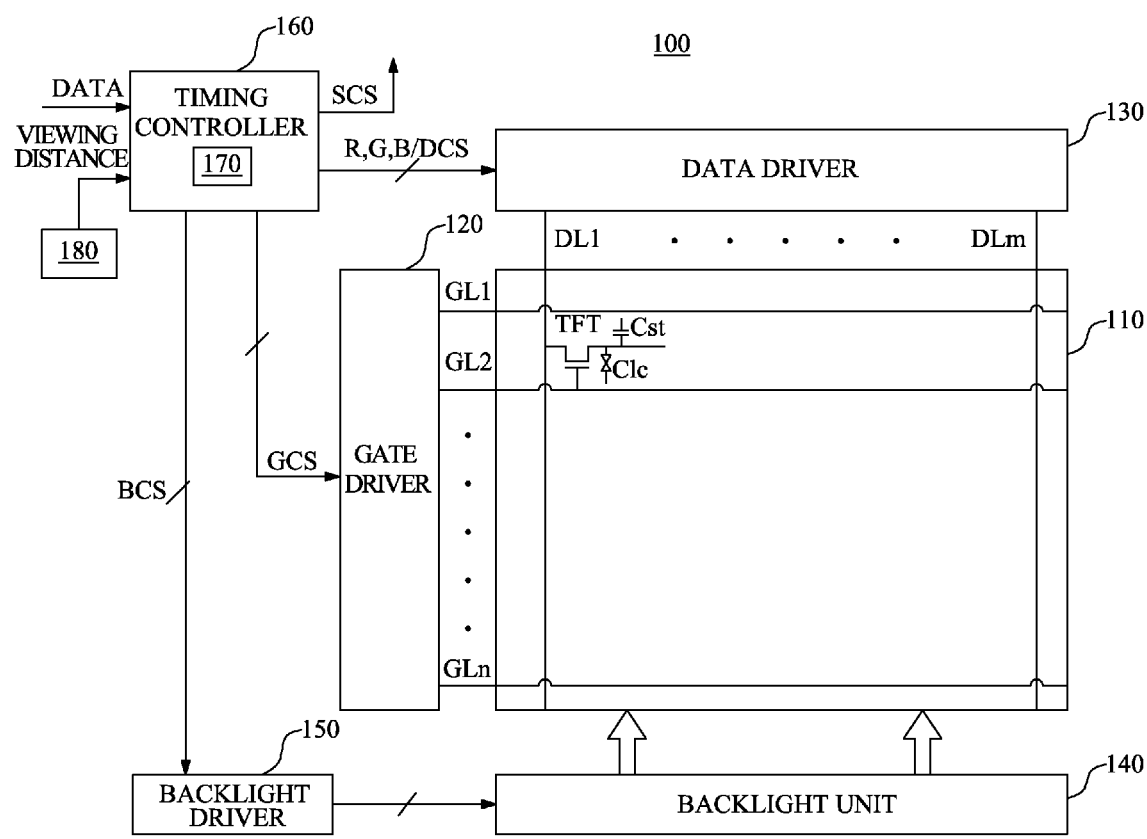
FIG. 6 illustrates an LCD device according to an embodiment of the present invention.

FIG. 5 illustrates a 2D/3D image converting method in an LCD device according to an embodiment of the present invention. FIG. 6 illustrates an LCD device according to an embodiment of the present invention.

Referring to FIGS. 5 and 6, the LCD device 100 according to the embodiment of the present invention measures a viewing distance for a 3D-image displaying mode. If the measured viewing distance is less than a preset reference distance, a 3D image is automatically changed into a 2D image, and the 2D image is displayed.

Under the circumstance that a user wears 3D glasses (for example, shutter glasses or polarizing glasses, 200) for watching the 3D image, the user watches the 3D image so that it is possible to prevent image distortion and visual fatigue occurrence.

In this case, a distance between the user and the LCD device 100 may be measured by the LCD device 100 or a distance-measuring sensor (for example, an infrared sensor) provided inside the 3D glasses 200.

The image conversion from the 3D image to the 2D image may be changed according to the type of 3D glasses 200, that is, according to the shutter glasses or polarizing glasses.

Generally, if applying the 3D glasses 200 of the shutter glasses, left-eye shutter and right-eye shutter for respective left-eye image and right-eye image alternate between opened and closed states with the difference in time.

In case of the present invention, when the 3D image is converted into the 2D image, both the left-eye shutter and right-eye shutter are in the opened state, whereby the same 2D image is perceived by the left and right eyes of the user.

Generally, when the 3D glasses 200 use the polarizing glasses of patterned retarder type, the left-eye image is displayed in pixels corresponding to the half of pixels included in a liquid crystal panel; and the right-eye image which is different from the left-eye image is displayed in pixels corresponding to the other half of the pixels included in the liquid crystal panel.

In case of the present invention, when the 3D image is converted into the 2D image, both the left-eye image and right-eye image are displayed as the same image, whereby the same 2D image is perceived by the left and right eyes of the user.

For this, the LCD device 100 according to the embodiment of the present invention includes a liquid crystal panel 110, a gate driver 120, a data driver 130, a backlight unit 140, a backlight driver 150, a timing controller 160, an image mode controller 170, and a distance measuring unit 180.

The image mode controller 170 may be provided inside the timing controller 160.

In above FIG. 6, the distance measuring unit 180 is provided inside the LCD device 100, but not necessarily. The distance measuring unit 180 may be provided inside the 3D glasses 200 such as the shutter glasses.

The liquid crystal panel 110 includes a plurality of gate lines (G1 to Gn), a plurality of data lines (D1 to Dm), and a plurality of liquid crystal cells (Clc, pixel regions) formed in every region defined by crossing the plurality of gate lines and the plurality of data lines.

The liquid crystal cell includes a storage capacitor (Cst) and a thin film transistor (TFT) formed adjacent to the crossing portion of the gate and data lines.

The thin film transistor (TFT) supplies an analog data signal (data voltage), which is supplied via the data lines in response to a scan signal supplied via the gate lines, to the liquid crystal cells.

The liquid crystal panel 110 cannot emit in itself. Thus, images are displayed by the use of light emitted from the backlight unit 140.

The backlight unit 140 may be classified into an edge type and a direct type according to an arrangement type of backlight (light source), wherein the edge type is provided with backlights arranged in a lateral direction of the liquid crystal panel 110, and the direct type is provided with backlights arranged in a rear direction of the liquid crystal panel 110.

The backlight unit 140 is provided to supply the light to the liquid crystal panel 110. The backlight unit 140 may include a plurality of backlights (Cold Cathode Fluorescent Lamp (CCFL), External electrode Fluorescent Lamp (EEFL), Light Emitting Diode (LED)); and optical members (light-guiding plate, light-diffusion plate, optical sheets) which guide the light emitted from the backlight toward the liquid crystal panel 110, and enable to improve light efficiency.

The backlight driver 150 drives the light source in accordance with a backlight control signal (BCS) supplied from the timing controller 160.

At this time, the backlight driver 150 controls on-off state of the backlight and driving frequency in accordance with the backlight control signal (BCS). Also, the backlight driver 150 may control luminance of the backlight so as to display the clear image on the liquid crystal panel 110.

The gate driver 120 generates the scan signal for driving the thin film transistor (TFT) in each liquid crystal cell on the basis of a gate control signal (GCS) supplied from the timing controller 160; and then sequentially supplies the generated scan signal to the gate lines (G1 to Gn) of the liquid crystal panel 110, to thereby drive (switch) the thin film transistor (TFT).

The data driver 130 converts digital image data (R, G, B) supplied from the timing controller 160 to the analog data signal (data voltage). The converted analog data signal is supplied to the data lines in response to a data control signal (DCS) supplied from the timing controller 160. That is, the analog data signal is supplied to the respective liquid crystal cells turned-on by the scan signal.

In this case, the data driver 130 is supplied with digital image data of the 2D image or 3D image based on the image set in the image mode controller 170.

The timing controller 160 generates the gate control signal (GCS) for controlling the gate driver 120 through the use of vertical/horizontal synchronous signal (Vsync/Hsync) and clock signal (CLK); and the data control signal (DCS) for controlling the data driver 130. The generated gate control signal (GCS) is supplied to the gate driver 120, and the generated data control signal (DCS) is supplied to the data driver 130.

At this time, the data control signal (DCS) may include a source start pulse (SSP), a source sampling clock (SSC), a source output enable (SOE), and a polarity control signal (POL).

The gate control signal (GCS) may include a gate start pulse (GSP), a gate shift clock (GSC), and a gate output enable (GOE).

Also, the timing controller 160 aligns externally-provided image signals; converts the aligned image signals to digital image data (R, G, B) by frame unit; and supplies the digital image data aligned by frame unit to the data driver 130.

At this time, the digital image data (R, G, B) is aligned to be the 2D image data or 3D image data depending on the image mode set in the image mode controller 170 according to the embodiment of the present invention, and is then supplied to the data driver 130.

The distance measuring unit 180 converts the 3D image into the 2D image, or converts the 2D image into the 3D image in accordance with the viewing distance between the user and the LCD device 100. For this, the distance measuring unit 180 may include the distance-measuring sensor (for example, infrared sensor).

The distance measuring unit 180 measures the distance between the LCD device 100 and the 3D glasses 200 or between the LCD device 100 and the user by the use of distance-measuring sensor; and then supplies the measured distance to the image mode controller 170.

The image mode controller 170 sets the image mode to be displayed on the liquid crystal panel 110 on the basis of the distance measured by the distance measuring unit 180.

For example, under the state that the 3D image is displayed on the liquid crystal panel 110, if the measured distance between the LCD device 100 and the 3D glasses 200/the user is less than the preset reference distance, the 3D image mode is converted into the 2D image.

Then, information about the mode conversion from the 3D image mode to the 2D image mode is supplied to the timing controller 160, whereby the digital image data aligned by frame unit is controlled in the timing controller 160. That is, the image data supplied from the timing controller 160 to the data driver 120 is aligned to be the 2D image data.

As mentioned above, the mode conversion from the 3D image to the 2D image may be changed according to the type of 3D glasses 200, that is, according to the shutter glasses or polarizing glasses.

Figure 7:
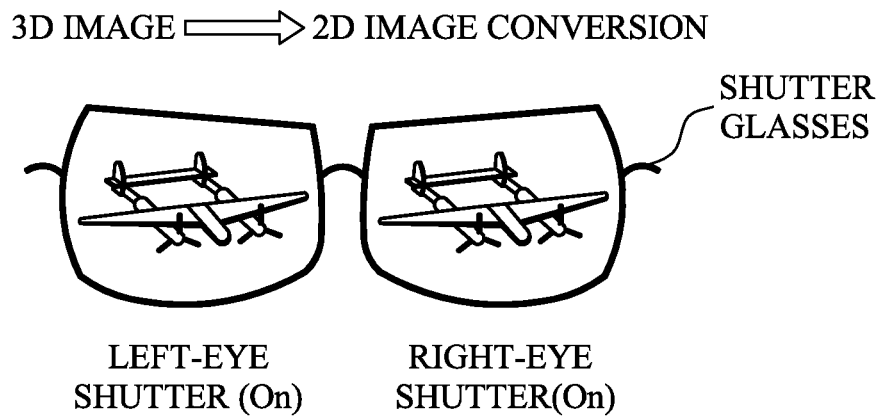
FIG. 7 illustrates a 2D/3D image converting method according to the first embodiment of the present invention when a shutter glass method is applied.

As shown in FIG. 7, in case of the 3D glasses 200 using the shutter glasses, the left-eye image and right-eye image are displayed with the difference in time on the liquid crystal panel 110. Also, the left-eye shutter and right-eye shutter of the shutter glasses are in the opened state so that the same 2D image is perceived by both the left eye and right eye of the user.

Figure 8:
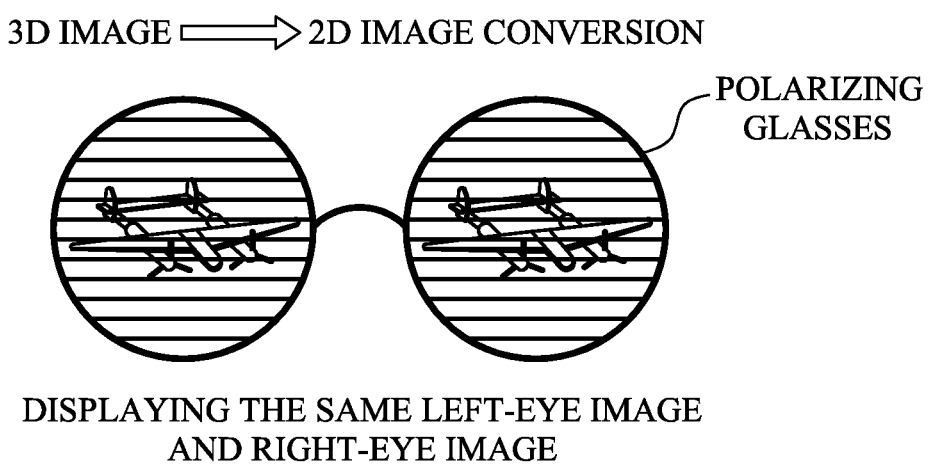
FIG. 8 illustrates a 2D/3D image converting method according to the second embodiment of the present invention when a polarizing glass method is applied.

Meanwhile, in case of the 3D glasses 200 using the polarizing glasses, as shown in FIG. 8, the same left-eye image and right-eye image are displayed on the pixels of the liquid crystal panel 110. The same 2D image is perceived by the user's left and right eyes through the polarizing glasses.

As the 3D image is automatically converted into the 2D image in accordance with the viewing distance, it is possible to reduce the image distortion of the 3D image, and to reduce the user's visual fatigue when the user watches the 3D image at a short viewing distance.

As mentioned above, the 3D glasses 200 may use the shutter glasses or polarizing glasses. At this time, if the 3D image is realized through the 3D glasses 200 using the shutter glasses, the LCD device 100 may include a shutter glass controller (not shown). The shutter glass controller may be provided inside the timing controller 160.

The shutter glass controller operates the shutter glass in accordance with the 2D/3D image mode set by the image mode controller 180. In more detail, the shutter glass controller generates a shutter glass control signal (SCS) for controlling the on-off state of the left-eye shutter and right-eye shutter. The generated shutter glass control signal (SCS) is supplied to the shutter glasses.

For the 3D image mode, the left-eye shutter and right-eye shutter for respective left-eye image and right-eye image alternate between opened and closed states with the difference in time.

As shown in FIG. 7, when the 3D image mode is converted into the 2D image, mode, both the left-eye shutter and right-eye shutter are in the opened state so that the same 2D image is perceived by the user's left eye and right eye.

For this, the shutter glass controller includes a means (module) for generating and transmitting the shutter glass control signal (SCS). The shutter glass control signal (SCS) may be transmitted to the shutter glasses via wireless or wire medium. At this time, the shutter glass control signal (SCS) may be generated and transmitted to the shutter glasses by the use of vertical/horizontal synchronous signal (Vsync/Hsync).

In this case, the left-eye shutter and right-eye shutter of the shutter glasses may be opened or closed through the use of liquid crystal. If the liquid crystal is normally white, light may be transmitted through the left-eye shutter and right-eye shutter by cutting off the power supplied to the left-eye shutter and right-eye shutter.

Meanwhile, if the liquid crystal is normally black, the power is supplied to the left-eye shutter and right-eye shutter, whereby the light is transmitted through the left-eye shutter and right-eye shutter.

Figure 9:
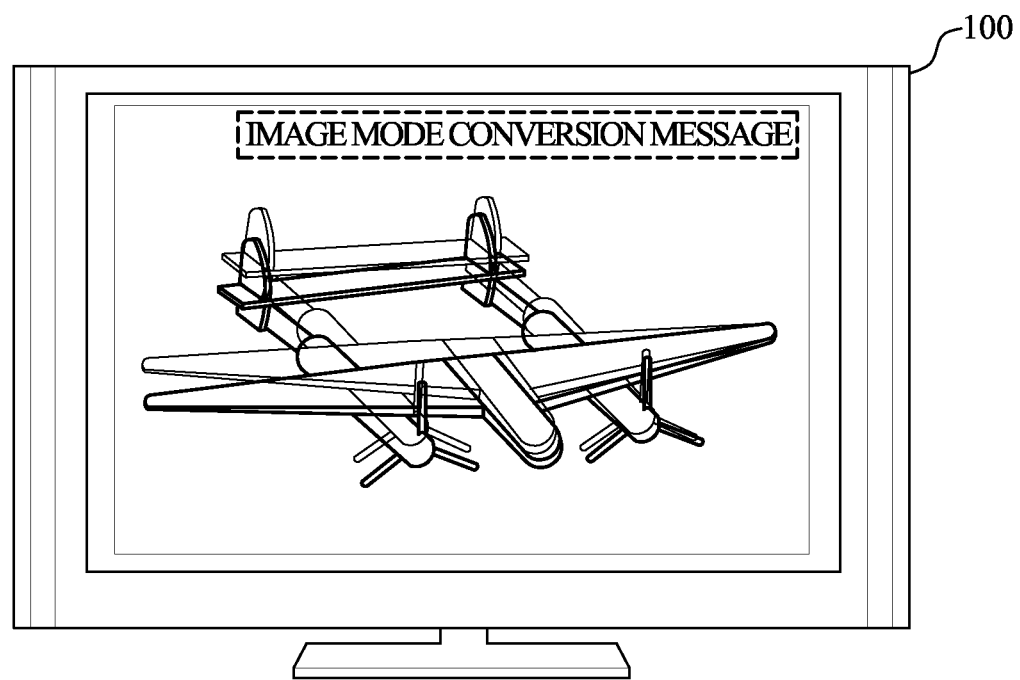
FIG. 9 illustrates a method for guiding a user in performing an image mode conversion in accordance with a viewing distance.

Based on the measured distance, the 3D image mode may be converted into the 2D image mode. At this time, the image mode controller 170 enables to inform the user that the 3D image is displayed as the 2D image by the automatic image mode conversion. For example, as shown in FIG. 9, a message informing the image mode conversion is displayed on a display screen of the liquid crystal panel 110, whereby the user can know that the 3D image is displayed as the 2D image.

For example, the image mode controller 170 enables to display a message informing the automatic image mode conversion from the 3D image mode to the 2D image mode in a partial area of the entire display screen of the liquid crystal panel 110 when the user's viewing distance becomes shorter than the preset reference distance. At this time, there may be the present viewing distance displayed, and a message displayed to inform that the user has to maintain the viewing distance above the preset reference distance when the user wants to change the image mode from the 2D image mode to the 3D image mode.

According to another embodiment of the present invention, under the circumstance that the 2D image is displayed by the image mode conversion from the 3D image mode to the 2D image mode, the image mode controller 170 may convert the 2D image mode into the 3D image mode on the basis of the viewing distance measured in the distance measuring unit 180.

Based on the distance measured in the distance measuring unit 180, if the viewing distance between the LCD device 100 and the 3D glasses 200 or between the LCD device 100 and the user is above the preset reference distance, the image mode controller 170 converts the 2D image mode into the 3D image mode. That is, if the user's viewing distance is appropriate for viewing the 3D image, the 2D image mode is converted into the 3D image mode.

If the 3D glasses 200 use the shutter glasses, the 2D image mode may be converted into the 3D image mode. In this case, the shutter glass controller controls the shutter glasses so as to alternate the left-eye shutter and right-eye shutter between opened and closed states with the difference in time for the 3D image mode set by the image mode controller 170.

In more detail, the shutter glass control signal (SCS) is generated in such a manner that the left-eye shutter is opened for displaying the left-eye image, and the right-eye shutter is opened for displaying the right-eye image.

The shutter glasses may be operated in accordance with the shutter glass control signal (SCS), and more particularly, the left-eye shutter and right-eye shutter of the shutter glasses selectively alternate between opened and closed states, whereby the image displayed on the liquid crystal panel 110 may be recognized as the 3D image by the user.

Meanwhile, if using the 3D glasses 200 of the polarizing glasses, the 2D image mode may be converted into the 3D image mode. In this case, the image mode controller 170 controls the image data to display the left-eye image in the pixels corresponding to the half of the pixels included in the liquid crystal panel 110 and to display the right-eye image in the pixels corresponding to the other half of the pixel included in the liquid crystal panel 110, wherein the left-eye image and right-eye image are different from each other.

According as the different 2D left-eye image and 2D right-eye image are displayed by the use of polarizing glasses, the 3D image is finally perceived by the user.

Based on the measured viewing distance, the 2D image mode may be converted into the 3D image mode. At this time, the image mode controller 170 enables to inform the user that the 2D image is displayed as the 3D image by the automatic image mode conversion. For example, as shown in FIG. 9, the message informing the image mode conversion may be displayed on the display screen of the liquid crystal panel 110.

Meanwhile, the user may select the image mode (2D image mode, 3D image mode) without regard to the viewing distance. If the user directly selects the image mode, the image may be displayed in the 2D image mode or 3D image mode set without regard to the viewing distance.

For the above explanation of the present invention, the image controller 170 is provided inside the timing controller 160, but not necessarily. According to another embodiment of the present invention, the image mode controller 170 may be independently provided in the LCD device 100.

For the above explanation of the present invention, the shutter glass controller is provided inside the timing controller 160, but not necessarily. According to another embodiment of the present invention, the shutter glass controller may be independently provided in the LCD device 100.

Accordingly, the picture quality of the image displayed on the LCD device according to the present invention is improved.

The LCD device according to the embodiment of the present invention can improve the picture quality of 2D and 3D images by automatically converting the image driving mode (2D/3D) in accordance with the viewing distance.

Also, the LCD device according to the embodiment of the present invention can improve the picture quality by preventing the image distortion for viewing 3D image at the short distance from the liquid crystal panel.

Also, the LCD device according to the embodiment of the present invention can prevent the user's visual fatigue when the user watches 3D image at the short distance from the liquid crystal panel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An LCD device for displaying both 2D and 3D images comprising:
    a distance measuring unit which measures a viewing distance between the LCD device and a viewer;
    an image mode controller which sets a 2D image mode or 3D image mode in accordance with a comparison result between the viewing distance and a preset reference distance to thereby reduce image distortion and visual fatigue of the viewer;
    a timing controller which aligns externally-provided image signals in accordance with the 2D image mode or 3D image mode set by the image mode controller, and converts the aligned image signals into image data by frame unit; and
    a liquid crystal panel which displays an image based on the 2D image mode or 3D image mode,
    wherein the image mode controller allows the liquid crystal panel to display a current viewing distance, and
    Wherein when in the 2D image mode, the image mode controller displays a message indicating the current viewing distance and indicating that the viewer must maintain the current viewing distance above the preset reference distance to change the image mode from the 2D image mode to the 3D image mode.

2. The LCD device according to claim 1, wherein the image mode controller converts the 3D image mode into the 2D image mode when the measured viewing distance is less than the preset reference distance.

3. The LCD device according to claim 2, wherein, if 3D glasses for making the image on the liquid crystal panel recognized as the 3D image correspond to shutter glasses, the image mode controller controls the shutter glasses to make left-eye shutter and right-eye shutter of the shutter glasses open.

4. The LCD device according to claim 2, wherein, if 3D glasses for making the image on the liquid crystal panel recognized as the 3D image correspond to polarizing glasses, the image mode controller controls a conversion of the image data to display the same left-eye image and right-eye image on the liquid crystal panel.

5. The LCD device according to claim 1, wherein, if the viewing distance is not less than the preset reference distance, the image mode controller converts the 2D image mode into the 3D image mode.

6. The LCD device according to claim 1, wherein the image mode controller displays a message, which informs the conversion of 2D image mode or 3D image mode in accordance with the comparison result between the viewing distance and the preset reference distance, on the liquid crystals panel.

7. The LCD device according to claim 1, wherein the distance measuring unit is provided in the LCD device or 3D glasses for making the image on the liquid crystal panel recognized as the 3D image, wherein the 3D glasses correspond to shutter glasses or polarizing glasses.

8. A method for driving an LCD device for displaying both 2D and 3D images comprising:
    measuring a viewing distance between the LCD device and a viewer;
    setting a 2D image mode or 3D image mode in accordance with a comparison result between the viewing distance and a preset reference distance to thereby reduce image distortion and visual fatigue of the viewer;
    aligning externally-provided image signals in accordance with the 2D image mode or 3D image mode set by the image mode controller, and converting the aligned image signals into image data by frame unit;
    displaying an image based on the 2D image mode or 3D image mode;
    displaying a current viewing distance with respect to the measured viewing distance; and
    when in the 2D image mode, indicating the current viewing distance and indicating that the viewer must maintain the current viewing distance above the preset reference distance to change the image mode from the 2D image mode to the 3D image mode.

9. The method according to claim 8,
    wherein the 3D image mode is converted into the 2D image mode when the measured viewing distance is less than the preset reference distance, and
    if 3D glasses for making the image on the liquid crystal panel recognized as the 3D image correspond to shutter glasses, the image mode controller controls the shutter glasses to make left-eye shutter and right-eye shutter of the shutter glasses open.

10. The method according to claim 8,
    wherein the 3D image mode is converted into the 2D image mode when the measured viewing distance is less than the preset reference distance, and if 3D glasses for making the image on the liquid crystal panel recognized as the 3D image correspond to polarizing glasses, the image mode controller controls a conversion of the image data to display the same left-eye image and right-eye image on the liquid crystal panel.

* * * * *